United States Patent [19]

Smelley et al.

[11] 4,000,067
[45] Dec. 28, 1976

[54] METHOD FOR RAPID SEDIMENTATION OF FINE PARTICLES FROM SUSPENSIONS

[75] Inventors: Annie G. Smelley, Northport; Charles E. Spruiell, Jr., Tuscaloosa, both of Ala.

[73] Assignee: The United States of America as represented by the Secretary of the Interior, Washington, D.C.

[22] Filed: May 21, 1976

[21] Appl. No.: 688,659

[52] U.S. Cl. .............................. 210/42 R; 210/59; 423/167; 423/321 R
[51] Int. Cl.² .......................................... C02B 1/20
[58] Field of Search ............. 210/42 R, 10, 45, 47, 210/49, 51, 59, 52, 62, 65, 70, 83; 423/167, 321 R

[56] References Cited

UNITED STATES PATENTS

| 3,061,541 | 10/1962 | Henry | 210/47 |
| 3,707,523 | 12/1972 | Ledden et al, | 210/DIG. 29 |
| 3,887,482 | 6/1975 | Hellestam et al. | 210/47 |
| 3,932,275 | 1/1976 | Mewes et al. | 210/49 |

Primary Examiner—Frank A. Spear, Jr.
Assistant Examiner—Benoit Castel
Attorney, Agent, or Firm—William S. Brown; Donald R. Fraser

[57] ABSTRACT

Suspensions of fine particles such as phosphate ore slimes are caused to settle by reaction with hydrofluoric acid or equivalent F-containing material in order to effect rapid settling of particles from the aqueous suspensions.

1 Claim, 2 Drawing Figures

METHOD FOR RAPID SEDIMENTATION OF FINE PARTICLES FROM SUSPENSIONS

BACKGROUND OF THE INVENTION

1. Field of the Invention

This invention relates to an improved sedimentation procedure and more particularly to a method for the rapid settling of fine mineral particles from aqueous suspensions.

2. Description of the Prior Art

The prior art is well aware of the so-called wet process phosphoric acid systems in which phosphate ores such as phosphate rock and similar minerals are treated with a strong mineral acid such as sulfuric acid to effect acidulation of the rock and result in the production of phosphoric acid and a calcium sulfate precipitate usually called gypsum. U.S. Pat. Nos. 3,699,212 and 3,859,423 exemplify processes of this type. The basic mineral phosphate rock used in this process contains a substantial amount of silica materials in various forms and during the reaction, a substantial amount of materials, generally referred to as a phosphate slime slurry, is formed as a by-product, which by-product generally comprises a non-settling fine particle suspension containing various siliceous materials which are a combination of silicate minerals, for example attapulgite, montmorillonite and kaolinite clays. Because of the intricate network of the various clay materials within the slime system, the system is highly resistant to settling and therefore has usually been transferred to a settling pond where it may be permitted to stand for long periods of time in the hope that eventual settling will occur. However, because of recent thrusts in the areas of ecology, the leaching of the slimes by rain water and other nature systems has caused science to look for ways in which more rapid settling of the slime mixtures may be effected. The present invention provides a means by which the slime systems can be settled rapidly to result in fine particles of the minerals contained therein.

U.S. Pat. No. 3,493,340 to Bosen et al relates to the treatment of phosphate ore generally in the manner described and specifically teaches that the phosphate rock which is reacted with sulfuric acid contains fluoride, magnesium, silica and the like, and that various complexes of such solutions remain in the mixture and are difficult to remove. This patent is particularly concerned with magnesium impurities and does not suggest procedures for treating the resulting slime systems.

A more pertinent patent to the subject matter of the present invention is U.S. Pat. No. 3,061,541 to Henry which relates to the treatment of potable waters to separate suspended solids from the water. According to this patent an activated silica sol containing fluoride ions is produced by contacting a solution of sodium silicofluoride with sodium silicate, and then introducing the resulting reaction mixture into raw water to produce floc formation, clarification and fluoridation of the water. This patent however does not disclose the treatment of suspensions of the type described herein.

SUMMARY OF THE INVENTION

It is accordingly one object of the present invention to provide a method for the rapid sedimentation of fine particles from aqueous suspensions.

A still further object of the invention is to provide an improved method for the rapid settling of fine mineral particles from aqueous suspensions resulting from the mineral beneficiation of phosphate ores or processing of other fine particle suspensions.

A still further object of the present invention is to provide a method for the treatment of difficultly-separable slime systems by reaction with a fluorine-containing material to effect rapid settling thereof.

Further objects and advantages of the present invention will become apparent as the description thereof proceeds.

In satisfaction of the foregoing objects and advantages there is provided by this invention a method for the rapid settling of fine mineral particles from aqueous suspensions which comprises treating the suspensions with a fluoride under acidic conditions to result in a filterable mixture of fine particles of the minerals contained therein.

BRIEF DESCRIPTION OF THE DRAWING

Reference is now made to the drawings accompanying this applicaton wherein.

DESCRIPTION OF PREFERRED EMBODIMENTS

Figure 1:
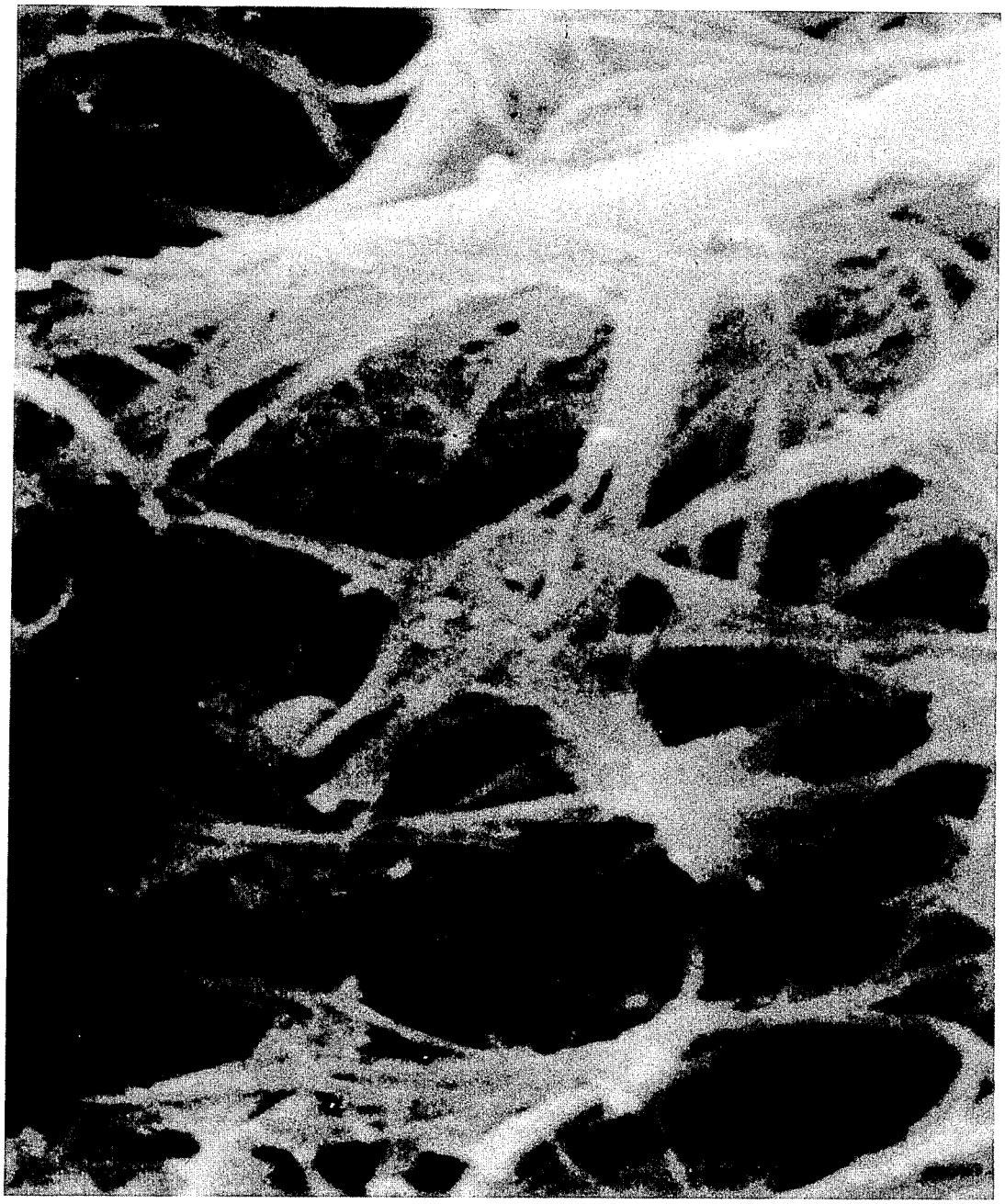
FIG. 1 is a photomicrograph showing a phosphate slime slurry prior to treatment.

As indicated above, this invention is concerned with the rapid settling of fine mineral particles from aqueous solutions. In a more specific description the invention is concerned with an improved method for effecting sedimentation of slime materials which are difficult to settle out of solution. One suspension with which the invention is particularly concerned is the mixture obtained in the mineral beneficiation of phosphate ores or processing of other fine particle suspensions. According to this invention, the fine particles or slime materials contained in such suspensions are rapidly settled into fine mineral particles from aqueous suspensions by reaction with hydrofluoric acid or other fluorine ion-containing acidic material.

The disposal of fine particle suspensions such as those obtained from the beneficiation of phosphate ores, has in the past been carried out by placing the suspensions in settling ponds and this is a common practice of many mineral beneficiation processes as described hereinabove. This procedure requires large retention ponds and very long settling periods some of which may be on the order of several years. The high water content of the material in the disposal ponds sometimes results in dam failure and the discharge of suspensions into rivers and estuaries causing serious damage to the acquatic environment and animal life. This, of course, is an undesirable consequence of this disposal method.

According to this invention, such fine particle suspensions generally called slimes, are reacted with hydrofluoric acid or equivalent fluorine-ion containing material to result in conversion of the non-settling fine particle suspension into settleable particles or solids and thus produce an effective dewatering of the solids. The degree of settling obtained with the fluorine bearing reagent is greatly superior to other halogen bearing reagents and other chemical reagents.

In practicing the invention, the non-settling fine particle aqueous suspension is treated with hydrofluoric acid or salt of a hydrofluoric acid in a ratio preferably of about 1:1. Although the theory involved in the function of the invention has not been completely characterized, it is believed that for a phosphate slime, the slime system is composed of a combination of silicate minerals such as attapulgite, montmorillonite and kaolinite clays. Because of the intricate network among the clay particles the system is highly resistant to settling. With the addition of hydrogen fluoride to the system, alteration of the silicate minerals and the network takes place to result in the production of fine particles of the minerals thus enhancing settling.

As indicated, excellent settling of the slimes or fine particles is obtained at about a 1:1 ratio of fluoride ion to dry slime material. At lower ratios of fluoride ion, a gel forms and the degree of settling decreases with decreasing ratios. On the other hand, at ratios of fluoride ion higher than the 1:1 ratio, settling is as good or better. However, since 1:1 ratio provides good results, the addition of greater amounts of fluoride ion would be uneconomical.

As indicated, the lower concentrations of fluoride ion do not provide the good results of the 1:1 ratios. Thus, apparently the reaction taking place must go essentially to completion in order to convert the slimes to filterable particles. While it is possible that the reaction produces an aluminumhydroxy fluoride and soluble silicon tetrafluoride, this is only a theoretical possibility and we do not wish to be limited to any theoretial explanation for the reaction.

The fluoride material such as HF is added to suspension at temperatures of about 20° to about 50° C. Addition at room temperature is satisfactory and preferred. After the addition, reaction begins immediately, settling begins in 5–10 minutes, and proceeds rapidly.

Figure 2:
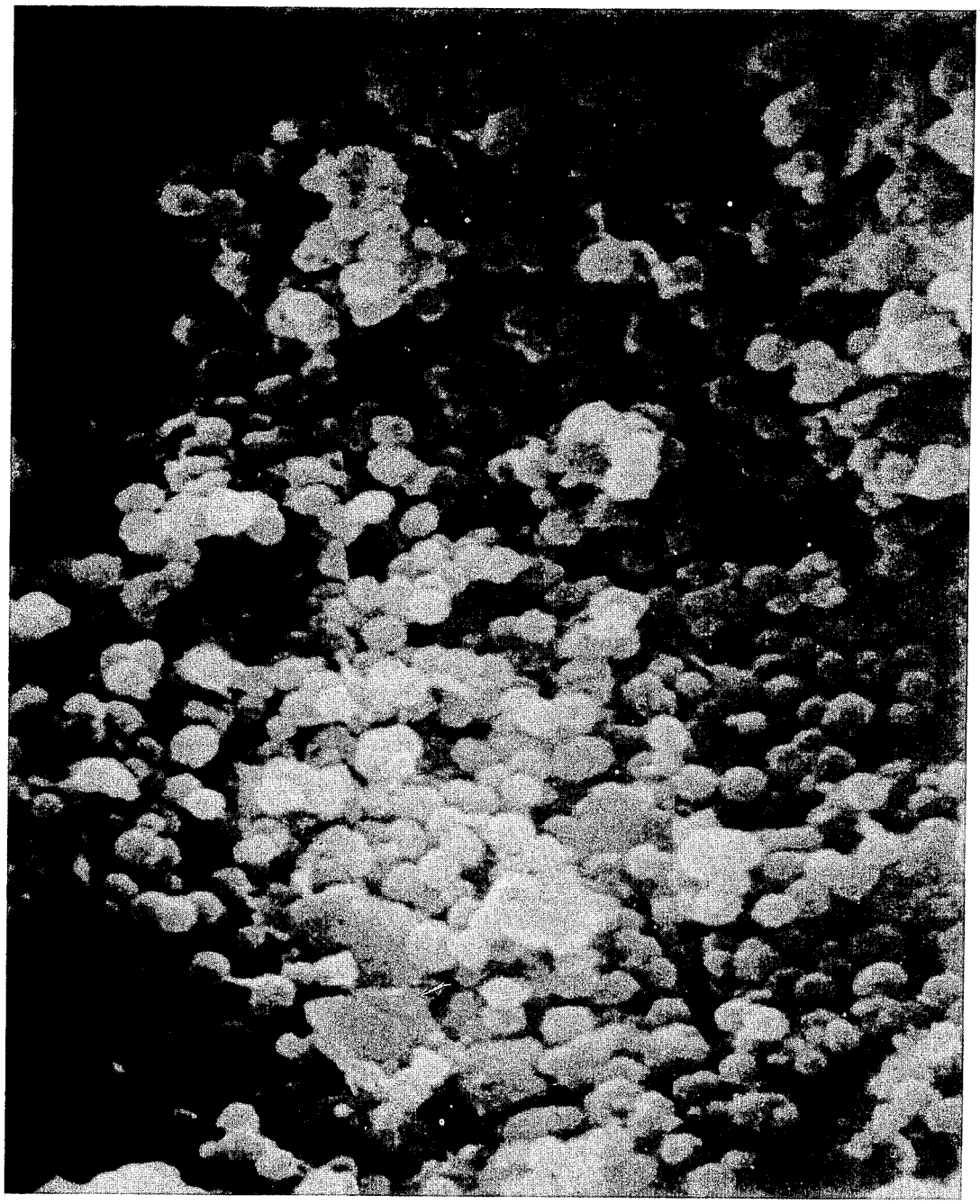
FIG. 2 shows a phosphate slime slurry after treatment using the process of the present invention and particularly showing the fine mineral particles.

The settling effect is particularly illustrated in the drawings accompanying the application. FIG. 1 is a photomicrograph of a phosphate slime prior to settling. Magnification is about 40,000X. FIG. 2 shows the same phosphate slime after treatment with hydrofluoric acid, the same magnification being used. As will be seen, the mixture has been converted to fine distinct particles which are settleable and filterable. In comparing FIG. 1 and FIG. 2, the distinctly slimey and stringy material of FIG. 1 has been converted to relatively rounded particles which settle to the bottom of the pond. Thus, the effect obtained by treatment with fluoride ion is quite dramatic.

The preferred fluorine containing material for use in practicing the process of this invention is hydrofluoric acid. However, ammonium fluoride or mixtures thereof with hydrofluoric acid as well as hydrofluorosilicic acid are also operable and within the scope of the invention. The essential requirements for obtaining the enhanced settling by the addition of the fluorine containing compound is the presence of the fluoride ion in combination with a low pH, i.e. about 0.5 to 5. Thus, the optimum material for use is hydrofluoric acid.

The following example is presented to show a specific embodiment of the invention; however, it is not to be considered as limited thereto as the examples are presented to illustrate the invention. In the example and throughout the disclosure, parts are by weight unless otherwise indicated.

EXAMPLE

A phosphate slime mixture obtained from the beneficiation of phosphate ore was treated in a 1:1 ratio with hydrofluoric acid, the weight ratio being based on the amount of dry slime material present in the suspension as analyzed and calculated from samples. The hydrofluoric acid was a dilute aqueous solution. The hydrofluoric acid was added at room temperature and settling of the mixture began about 5 to 10 minutes after addition of the hydrofluoric acid. At the conclusion of 1 hour, settling was sufficiently complete to provide a filterable system.

Use of the invention is not limited to settling of phosphate slimes but may also be used on any suspension of fine particles reacting suitably in a system containing fluoride bearing reagent. Thus, it may be used on a variety of clay systems, such as bentonite and other systems which are difficult to filter, obtained from a variety of reactions and beneficiation processes.

The invention has been described herein with reference to certain preferred embodiments. However, it is not to be considered as limited thereto as obvious variations thereon will become apparent to those skilled in the art.

What is claimed is:

1. A method for enhancing the settling of fine mineral particles contained in a slime mixture obtained from the mineral beneficiation of phosphate ores comprising adding to said slime mixture at least a 1:1 weight ratio of a fluoride containing material from the group consisting of hydrofluoric acid, ammonium fluoride, hydrofluorosilicic acid, and mixtures thereof at a pH of about 0.5 to 5.0.

* * * * *